June 20, 1967  A. G. BADE  3,326,503
SPEED REDUCER MOUNTING ASSEMBLY
Filed Sept. 3, 1965  2 Sheets-Sheet 1
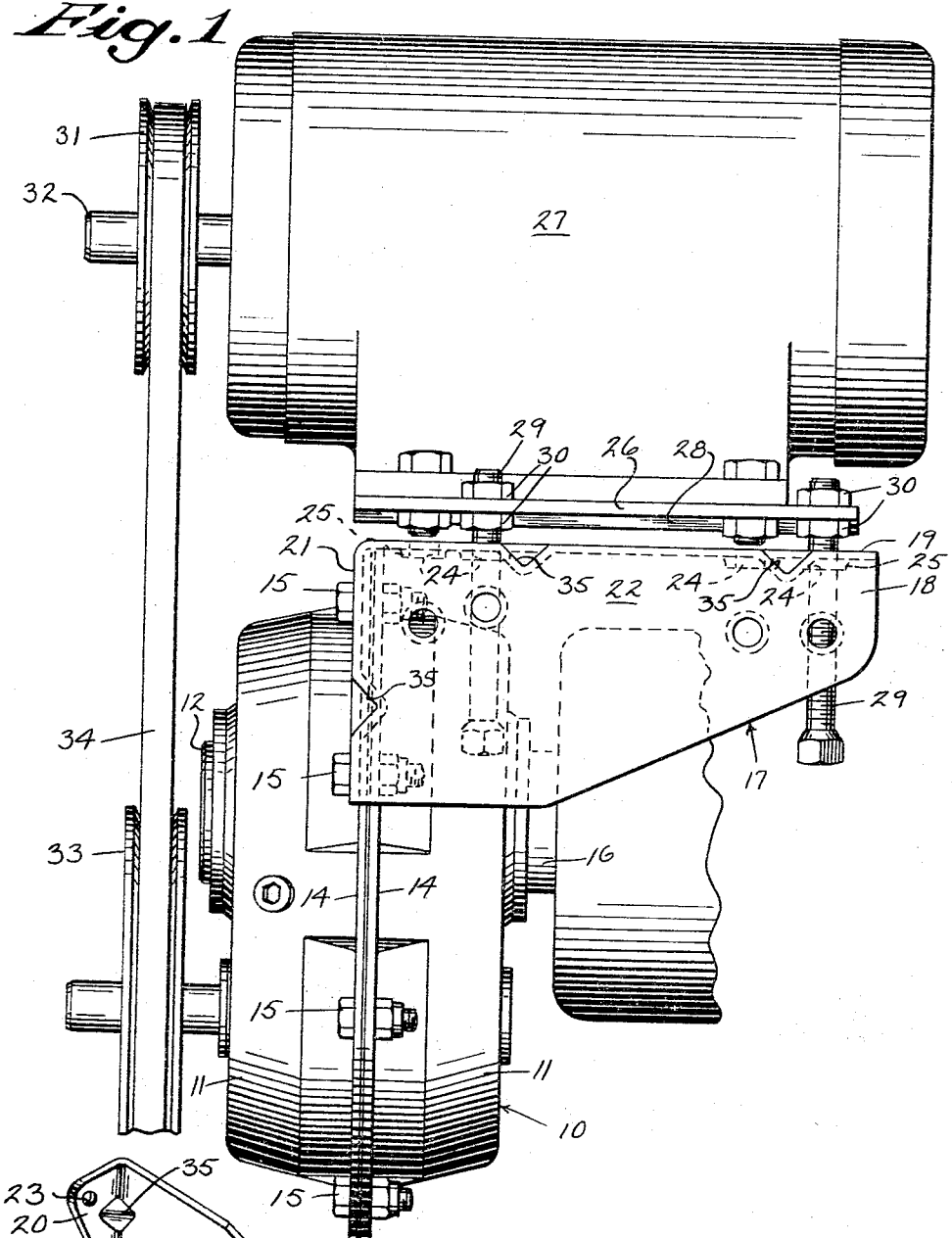
INVENTOR
ALFRED G. BADE
BY Thomas W. Ehrmann
ATTORNEY June 20, 1967   A. G. BADE   3,326,503
SPEED REDUCER MOUNTING ASSEMBLY
Filed Sept. 3, 1965   2 Sheets-Sheet 2
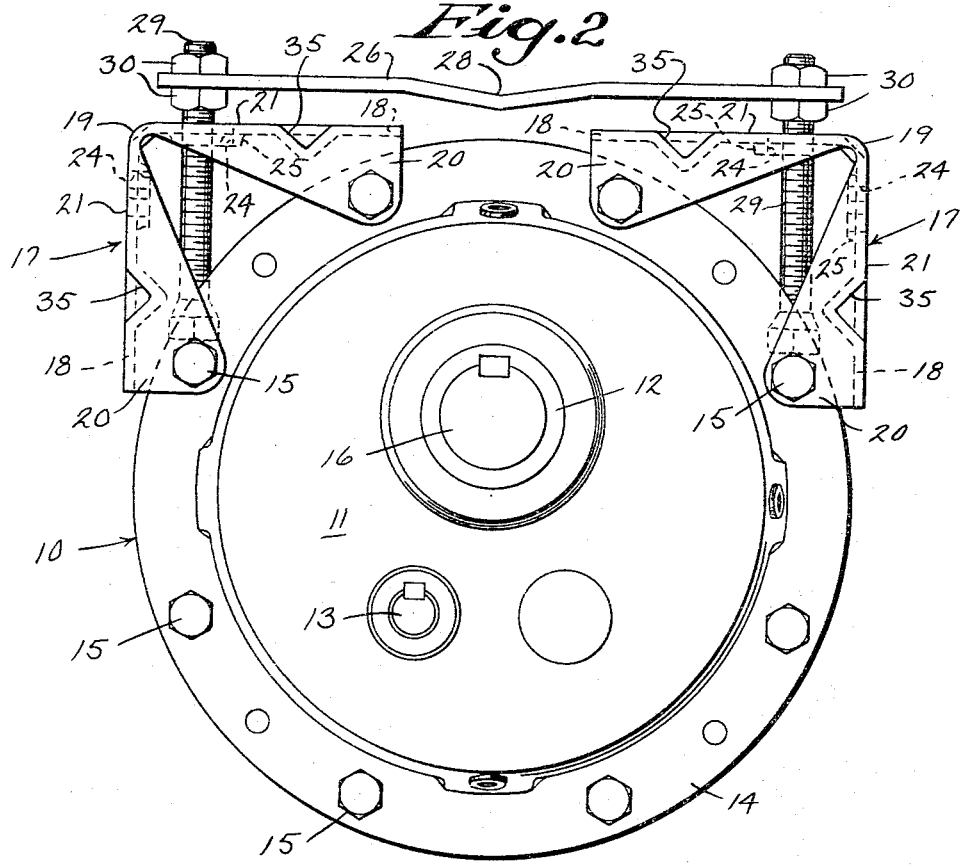
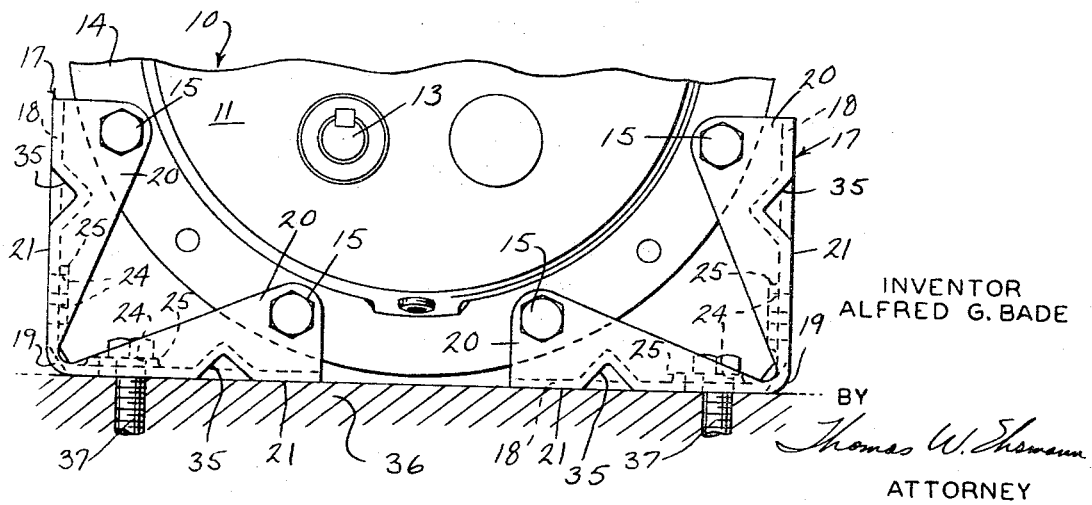
INVENTOR
ALFRED G. BADE
BY
Thomas W. Thomann
ATTORNEY

United States Patent Office 3,326,503
Patented June 20, 1967

3,326,503
SPEED REDUCER MOUNTING ASSEMBLY
Alfred G. Bade, Brookfield, Wis., assignor to The Falk Corporation, Milwaukee, Wis., a corporation of Wisconsin
Filed Sept. 3, 1965, Ser. No. 485,051
5 Claims. (Cl. 248—14)

This invention relates to a mounting assembly for a speed reducer, and more particularly to a mounting assembly comprised of identical brackets which are adapted to function either alone or with added mounting plates to mount a motor or other accessory equipment on a speed reducer and alternately to function as a pedestal for mounting the speed reducer on a support.

It is an object of this invention to provide an improved mounting assembly for a speed reducer which is economical and simple to install, and which comprises a pair of identical mounting brackets that are interchangeable and result in reduced inventory requirements.

It is another object of this invention to provide such mounting brackets which may be formed by simple metal stamping operations.

It is a further object of this invention to provide such a mounting assembly which is adapted to be mounted on a speed reducer having circular housing halves joined together by a radially extending peripheral flange which receives a plurality of spaced bolts that join the housing halves, and in which mounting brackets of the assembly are adapted to be secured to the speed reducer by such bolts.

It is also an object of this invention to provide such a mounting assembly in which each mounting bracket is comprised of a pair of legs formed at right angles to each other and which when mounted on the speed reducer have outer planar surfaces which lie on the sides of a square enclosing the speed reducer.

It is yet another object of this invention to provide such a mounting assembly which can function to support a motor on a shaft mounted speed reducer and which extends from the speed reducer in a direction opposite to that of the connected motor shaft and speed reducer shaft whereby the weight of the motor and mounting assembly will counterbalance the dynamic loads of the driving connection between the motor and the speed reducer.

The foregoing and other objects and advantages of this invention will appear in the description which follows: In the description reference is made to the accompanying drawings which form a part hereof and in which there is shown two embodiments of the invention. The embodiments will be described in sufficient detail to enable those skilled in the art to practice the invention; however, it will be apparent that changes can be made in the structure of the embodiments shown without departing from the scope of the invention.

In the drawings:

FIG. 1 is a side view in elevation of a speed reducer and motor with the motor mounted on a mounting assembly in accordance with this invention;

FIG. 2 is a front view in elevation of the speed reducer of FIG. 1 and the mounting assembly illustrated in FIG. 1 but with the motor and driving connections removed for clarity;

FIG. 3 is a view in perspective of a mounting bracket in accordance with this invention; and FIG. 4 is a partial front view in elevation of a speed reducer with mounting assembly attached and illustrating the use of the mounting assembly to function as a pedestal mount for the speed reducer.

In FIG. 1, the mounting assembly is shown applied to a shaft mounted speed reducer 10 of the type disclosed and described in the copending application of Clayton H. W. Polzin, Ser. No. 432,317, filed Feb. 12, 1965, for "Speed Reducer and Method of Making the Same," and assigned to the assignee of this invention. Only so much of the speed reducer 10 will be described as is necessary to understand the function of the mounting assembly of the present invention.

The speed reducer 10 is formed with a pair of identical circular dish shaped cover halves 11 that receive an output shaft 12 and an input shaft 13 together with interconnecting gearing (not shown) providing speed reduction. The cover halves 11 are each formed with mating radially extending mounting flanges 14 having a plurality of equally spaced openings that receive bolts 15 which join the cover halves 11. The quill output shaft 12 of the speed reducer 10 is adapted to receive a driven shaft 16 of an item of equipment to be driven. The weight of the speed reducer 10 and all accessories mounted thereon is borne by the driven shaft 16.

The mounting assembly is comprised basically of a pair of identical mounting brackets 17. Because of the shape of the brackets 17, which will be described in detail hereafter, the brackets 17 are ideally formed by stamping and piercing operations from a sheet of material usually steel plate. The brackets 17 each include a pair of mounting legs 18 joined at an apex bend 19 with the legs 18 at right angles to each other. A generally triangular tab 20 extends at right angles from a front edge 21 of each of the mounting legs 18 that is perpendicular to the apex 19 and with the tabs 20 of each bracket 17 directed towards each other. The outer surfaces 22 of the mounting legs 18 are planar and the tabs 20 of each bracket 17 lie in a common plane which is at right angles to the outer surfaces 22 of both mounting legs 18.

The tabs 20 are provided with mounting openings 23 adjacent their corners and the mounting openings 23 are adapted to receive the mounting bolts 15 of the speed reducer 10 to have the tabs 20 secured to the mounting flange 14. The mounting openings 23 are so located on the tabs 20 that the apexes 19 of the brackets 17 can be made to fall on adjacent corners of a square that encloses the speed reducer 10 and the outer surfaces 22 of the legs 18 then lie on sides of such square.

The mounting legs 18 are provided with a plurality of spaced threaded openings 24 which are defined in part by inwardly directed projections 25 formed by the piercing operation. The threaded openings 24 are adapted to receive bolts to mount accessory equipment on the mounting brackets 17 and in the embodiment shown in FIGS. 1 and 2 a motor mounting plate 26 and a motor 27 are attached to the mounting brackets 17. That is, the motor plate 26 spans the pair of mounting brackets 17 and is provided with a central relieved channel 28 for added strength and stability. The motor plate 26 is secured to the mounting bracket 17 by four bolts 29 that are received in threaded openings 24 of a leg 18 of each bracket 17 and through openings in the motor plate 26 with nuts 30 disposed above and below the motor plate 26. The motor plate 26 is provided with a plurality of sets of bolt openings selected to accommodate standard sizes of motors and the motor 27 is bolted to the motor plate 26.

The connection of the motor 27 to the speed reducer 10 can be accomplished by a V-belt drive which includes a pulley 31 secured to the motor shaft 32 and a second pulley 33 secured to the input shaft 13 of the speed reducer 10 with the pulleys 31 and 33 connected by a V-belt 34.

While the motor 27 has been shown as being secured to a motor plate 26, it will be apparent that larger motors having sufficient width between their mounting feet to span the space between the brackets 17 can be secured directly to the brackets 17 without the need of an intermediary motor plate 26. It will also be apparent that the mounting brackets 17 can be secured to the speed reducer 10 at any radial position about the flanges 14 so that a motor can be disposed to the side of the speed reducer or below it. Furthermore, other types of accessory equipment other than motors can be mounted on the mounting brackets 17.

For added rigidity in the mounting brackets 17, gussets 35 are formed transverse of the apex bend 19 and the front edges 21 to function as small beams resisting the further bending of the brackets about the apex bend 19 and front edges 21. It will be appreciated that each mounting bracket 17 is symmetrical about the apex bend 19 so that the mounting brackets 17 are interchangeable with each other.

Since the mounting brackets 17 are secured to the speed reducer 10 at one end, they can be mounted to project laterally from the speed reducer 10 in a direction opposite the input shaft 13 and the motor shaft 32. The weight of the motor 27 will then work through a moment arm relative to the mounting of the bracket 17 to the speed reducer 10 which will result in a moment that will balance the belt pulley forces developed in the V-belt drive so that the mounting bolts 15 which attach the brackets 17 to the speed reducer 10 are required to carry only the combined weight of the mounting assembly and motor 27 and are not subjected to torque forces. Obviously, the shaft mounted speed reducer 10 must be provided with a torque reaction means securing the speed reducer 10 to a fixed anchorage against rotation.

The mounting brackets 17 can also function as a mounting pedestal to secure a speed reducer to a fixed support. The use in such a manner is illustrated in the embodiment of FIG. 4 wherein the planar outer surfaces 22 of the pair of mounting brackets 17 rest upon a support 36, and foundation bolts 37 are received in the threaded openings 24 and extend into the support to mount the speed reducer 10.

It will be seen from the foregoing that the applicant has provided a simple, economical mounting assembly comprised of identical brackets which may be formed by simple stamping operations and which require small inventories. The mounting assembly admirably functions to mount auxiliary equipment including driving motors for the speed reducers and also functions as a pedestal support for the speed reducer.

I claim:

1. In a mounting assembly for a speed reducer formed of a pair of housing halves joined together at a radially extending peripheral flange by equally spaced bolts, the combination comprising: a pair of identical mounting brackets each including a pair of identical mounting legs extending at right angles to each other, and a pair of tabs each extending at right angles from an edge of a respective one of said legs with the tabs directed toward each other and lying in a common plane, each of said tabs having a mounting opening adapted to receive one of said bolts to have said brackets project away from the speed reducer with one leg of each bracket lying in a common plane that is spaced outwardly from the perimeter of the speed reducer.

2. A mounting assembly in accordance with claim 1 together with an accessory mounting plate spanning the space between said brackets and overlying the legs thereof, and means adjustably securing said plate in spaced relation to said legs of said brackets.

3. In a mounting assembly for a speed reducer formed of a pair of circular housing halves joined together at a radially extending peripheral flange by equally spaced bolts, the combination comprising: a pair of identical mounting brackets each comprising a pair of identical integral mounting legs extending at right angles to each other from an apex, and having a planar exterior surface, and a pair of tabs formed integral with said legs and each extending at right angles to an edge of a respective one of said legs that is perpendicular to said apex with the tabs directed toward each other and lying in a common plane, each of said tabs including a mounting opening adapted to receive one of said bolts to secure said tabs against said flange and locate the apexes of said brackets at the corners of a square that encloses the speed reducer so that said legs fall on sides of such square and provide a planar surface for mounting auxiliary equipment on said speed reducer or for mounting said speed reducer on a support.

4. A mounting assembly in accordance with claim 3 wherein said legs are provided with threaded openings, and together with an auxiliary mounting plate that spans the space between said brackets and overlies said legs and has openings therethrough, and bolts received in the threaded openings of said legs and the openings of said plate to adjustably support said plate on said brackets.

5. As a new article of manufacture, a mounting bracket for a speed reducer formed of a pair of circular housing halves joined together at a radially extending peripheral flange by equally spaced bolts, said bracket comprising: a pair of identical integral mounting legs extending at right angles to each other from an apex, and a pair of tabs formed integral with said legs and each extending at right angles to an edge of a respective one of said legs that is perpendicular to said apex with the tabs directed toward each other and lying in a common plane, each of said tabs including a mounting opening adapted to receive one of said bolts to secure said tabs against said flange, said mounting openings being so located as to have the apex of the bracket fall on the corner of a square that encloses the speed reducer.

References Cited

UNITED STATES PATENTS

| 675,735 | 6/1901 | Holland | 248—300 |
| 2,961,208 | 11/1960 | Luenberger | 248—16 |
| 2,976,745 | 3/1961 | Bade | 74—606 |
| 3,181,825 | 5/1965 | Jacoboice | 248—16 |

JOHN PETO, *Primary Examiner.*